United States Patent
Hartman et al.

(10) Patent No.: US 12,491,926 B2
(45) Date of Patent: Dec. 9, 2025

(54) SINGLE RADIAL WEDGE FOR STEERING COLUMN TUBE TO HOUSING DE-LASH

(71) Applicant: NSK STEERING SYSTEMS AMERICA, INC., Ann Arbor, MI (US)

(72) Inventors: David Ray Hartman, Brighton, MI (US); Victor Corona Martinez, Ann Arbor, MI (US); Antonio Otero, Ann Arbor, MI (US); Daniel Gazzerro, Ann Arbor, MI (US)

(73) Assignee: NSK Steering Systems America, Inc., Ann Arbor, MI (US)

( * ) Notice: Subject to any disclaimer, the term of this patent is extended or adjusted under 35 U.S.C. 154(b) by 0 days.

(21) Appl. No.: 18/853,550

(22) PCT Filed: Apr. 21, 2023

(86) PCT No.: PCT/US2023/019339
§ 371 (c)(1),
(2) Date: Oct. 2, 2024

(87) PCT Pub. No.: WO2023/211768
PCT Pub. Date: Nov. 2, 2023

(65) Prior Publication Data
US 2025/0222973 A1  Jul. 10, 2025

Related U.S. Application Data

(60) Provisional application No. 63/334,758, filed on Apr. 26, 2022.

(51) Int. Cl.
*B62D 1/185* (2006.01)
*B62D 1/181* (2006.01)
(Continued)

(52) U.S. Cl.
CPC .......... *B62D 1/192* (2013.01); *B62D 1/181* (2013.01); *B62D 1/185* (2013.01); *B62D 1/189* (2013.01)

(58) Field of Classification Search
CPC . B62D 1/16; B62D 1/18; B62D 1/181; B62D 1/183; B62D 1/185; B62D 1/187;
(Continued)

(56) References Cited

U.S. PATENT DOCUMENTS 3,491,614 A * 1/1970 Demske ................. B62D 1/192
403/325
5,152,627 A * 10/1992 Arnold .................. B62D 1/185
403/351
(Continued)

FOREIGN PATENT DOCUMENTS

DE  102010007823 A1 * 8/2011 ............. B62D 1/185
DE  10 2010 037312 B3  1/2012
JP  2006205956 A *  8/2006

OTHER PUBLICATIONS

International Search Report and Written Opinion, dated Oct. 9, 2023, for International Application PCT/US2023/019339.

*Primary Examiner* — Keith J Frisby
(74) *Attorney, Agent, or Firm* — The Dobrusin Law Firm, P.C.

(57) ABSTRACT

A wedge assembly for a steering column assembly including a wedge body and a pre-load member. The wedge body has a generally curved column tube contact face for contacting an outer surface of a column tube and a column housing contact face configured to contact a column housing. The wedge assembly has a thick edge and a thin edge, and the thickness of the wedge body decreases from the thick edge to the thin edge. The pre-load member has an elongated body between a first and a second end. The first end and the second end are secured to and/or positioned within the (Continued)

wedge body. A steering column assembly including the wedge assembly, a column tube, and column housing is also contemplated.

20 Claims, 4 Drawing Sheets

(51) Int. Cl.
*B62D 1/19* (2006.01)
*B62D 1/189* (2006.01)

(58) Field of Classification Search
CPC .......... B62D 1/189; B62D 1/19; B62D 1/192; B62D 1/184; Y10T 403/7051; Y10T 403/7052; Y10T 403/7054; Y10T 403/7058

USPC .......... 280/775, 777, 779; 74/493, 492, 552; 403/367, 368, 369
See application file for complete search history.

(56) References Cited

U.S. PATENT DOCUMENTS

| | | | | |
|---|---|---|---|---|
| 5,509,324 A * | 4/1996 | Cymbal | .................... | F16D 3/06 403/377 |
| 5,669,270 A * | 9/1997 | Cymbal | .................... | F16C 3/03 464/181 |
| 5,673,938 A * | 10/1997 | Kaliszewski | .......... | B62D 1/195 280/779 |
| 5,692,778 A * | 12/1997 | Cymbal | ................ | B62D 1/195 74/492 |
| 5,954,363 A * | 9/1999 | Cymbal | ................ | B62D 1/195 74/492 |
| 6,039,350 A * | 3/2000 | Patzelt | .................. | B62D 1/184 280/775 |
| 7,823,478 B2 * | 11/2010 | Ohtsu | .................... | B62D 1/184 280/775 |
| 2004/0113408 A1 * | 6/2004 | Yamamoto | ............. | B62D 1/184 280/775 |
| 2010/0176640 A1 * | 7/2010 | Hayashi | ................ | F16C 33/208 384/129 |
| 2013/0233117 A1 | 9/2013 | Read et al. | | |
| 2018/0156325 A1 | 6/2018 | Segawa | | |
| 2021/0213998 A1 * | 7/2021 | Kurokawa | ............. | B62D 1/185 |
| 2021/0394813 A1 * | 12/2021 | Kurokawa | ............. | B62D 1/181 |
| 2022/0297740 A1 * | 9/2022 | Oikawa | .................... | B62D 1/16 |

* cited by examiner

SINGLE RADIAL WEDGE FOR STEERING COLUMN TUBE TO HOUSING DE-LASH

CLAIM OF PRIORITY

This application claims the benefit of U.S. Provisional Application No. 63/334,758, filed on Apr. 26, 2022, the contents of which are hereby incorporated by reference in their entireties for all purposes.

FIELD

In general, the present teachings relate to an improved steering column assembly and methods associated with the same (e.g., methods of assembling a steering column assembly). More particularly, the present teachings are related to a subassembly within the steering column assembly for reducing or eliminating lash.

BACKGROUND

In the field of automotive vehicles, it has become popular to employ steering column assemblies that include tilt ("rake") and/or telescoping ("reach") functions. Assemblies that employ both tilt and telescoping functions are known also as "rake and reach steering column assemblies." The use of motors to translate a steering wheel relative to a vehicle operator also has seen increased use. It is common to employ motors to perform one or both of the tilt and telescoping functions. For example, one motor may be operated to actuate the steering column assembly generally in an upward or downward vertical direction to adjust the height of a steering wheel relative to an operator of the vehicle and thus perform the tilt function. Another motor may be operated to actuate the steering column assembly to adjust the fore/aft position of the steering wheel relative to the vehicle operator. The latter typically achieves the adjustment by way of translation of a telescopic tubing arrangement by which at least one inner tube associated with the steering wheel translates relative to a shaft for steering. In such telescope arrangement, a column tube may be permitted to translate fore and aft within and relative to a stationary column tube.

However, due to the fact that steering column assemblies are relatively large assemblies, even small differences in dimensional tolerances (e.g., between a column housing and a column tube) can result in a relatively large lash effect for the vehicle operator. That is, dimensional tolerance differences from vehicle to vehicle may lead to the potential for some vehicle operators to sense side to side motion of the steering column during steering column adjustment, or possibly even when steering.

One approach to reducing lash between a column tube and a column housing is to use a grub screw acting directly on a spring to pre-load a wear-resistant member against the column tube. However, this assembly requires many components and may require additional adjustments.

As can be appreciated, there are expected to be differing dimensional tolerances from one assembly to another. As a result, assembly operations can be potentially complicated and not as efficient as may be desired.

There is a need for an alternative assembly and method of making the assembly that will achieve steering column tube de-lash to the steering column housing, help to reduce the number of components, provide improved stiffness, reduce slide force, improve ease of assembly, reduce or eliminate the need for adjustments, or a combination thereof.

SUMMARY

The present teachings make use of a simple, yet elegant, construction approach by which relatively few components can be employed for achieving an adjustable steering column assembly, that simplifies manufacture of adjustable steering column assemblies, and that otherwise overcomes one or more of the previously stated problems.

The present teachings include a wedge assembly for a steering column assembly. The wedge assembly may include any of the following features in any combination.

The wedge assembly may be a radial wedge. The wedge assembly may include a wedge body. The wedge body may include a generally curved column tube contact face configured to contact an outer surface of a column tube and a column housing contact face configured to contact a column housing. The wedge body may have a pair of generally opposing long edges and a pair of generally opposing shorter edges. One of the edges (e.g., a long edge) may be a thick edge, and the opposing edge (e.g., the opposing long edge) may be a thin edge. The thickness of the wedge body may decrease from the thick edge to the thin edge.

The wedge body may include one or more features for engaging with a pre-load member, such as a post and/or a cavity. The wedge assembly may include a pre-load member. The pre-load member may be, for example, a spring, an extended member from the wedge body, or both. The pre-load member may be a spring such as a flat spring, a leaf spring, a wire spring, a steel spring, or a combination thereof. The pre-load member may be a flexible extended member of the wedge body. The flexible extended member may be a molded feature of the wedge body that can deform to provide preload. The pre-load member may be an elastically compressible material (e.g., rubber).

The pre-load member may have an elongated body between a first end and a second end. The first end, the second end, or both, of the pre-load member may be curved and/or coiled. The first end or the second end may be secured to and/or positioned at least partially around a feature of the wedge body, such as the post. The post may be defined by or created by a void of material surrounding the post. It is possible the post does not extend beyond the column housing contact face. The other of the second end or the first end may be received within another portion of the wedge body, such as a cavity. The pre-load member may be captured by one or more cavities along the wedge body. The wedge body may be free of a post. A load of the pre-load member may be generally tangential with respect to the column tube.

The wedge body may have a wedge angle of about 3 degrees or more, about 12 degrees or less, or both. The column tube contact face, the column housing contact face, portions thereof, or a combination, may have a generally curved contact surface. The angle between tangent lines along the generally curved contact surface may be about 3 degrees or greater, about 12 degrees or less, or both. A range of angles may be possible as the angle between the tangent of the curved surfaces may be constantly changing from the thin portion of the wedge to the thicker portion of the wedge.

The wedge assembly may include one or more securing features. For example, the wedge body may include a fastener channel for at least partially receiving a fastener. The fastener channel may penetrate a portion of the thickness of the wedge body. The fastener channel may have a length that is greater than its width to allow the fastener to remain within the channel while also allowing the wedge body to move within the steering column assembly to provide de-lashing between the column housing and the column tube. The fastener channel may have a length that extends in a direction generally orthogonal to a longitudinal axis of the wedge body. The fastener channel may extend from the thick edge toward the thin edge. A securing feature may be an extended member retained by a feature of the column housing. For example, the extended feature may be a snap-fit feature molded into the wedge body.

The cavity of the wedge may comprise one or more surfaces for contacting the first end or the second end of the pre-load member for defining the amount of movement of the pre-load member when compressed and/or to allow the pre-load member free movement through the operating range. The wedge assembly may have a controlled pre-load such that the wedge assembly creates a slide force between the column tube and the column housing of about 5 N to about 300 N.

The wedge body may have a thinned portion, and wherein the thinned portion has a thickness that is less than a thickness at another point in a line along a length of the wedge body. The thinned portion may be located on a surface of the wedge body configured to face the column tube. The thinned portion may be located on a surface of the wedge body configured to face the column housing. The thinned portion may be free of contact with the column tube, column housing, or both.

The present teachings also contemplate a steering column assembly for an automotive vehicle. The steering column assembly may include a column housing, a column tube, and the wedge assembly located between the column tube and the column housing. The column housing may include a recess for receiving the wedge assembly. The recess may be generally wedge-shaped such that the recess has a thick portion and a thin portion. The thick portion may be configured to receive the thick edge of the wedge body and the thin portion may be configured to receive the thin edge of the wedge body. The recess may include a contact edge that contacts the pre-load member of the wedge assembly. The column housing may include a fastener opening that is generally aligned with the fastener channel of the wedge body. A fastener may penetrate the opening and may be at least partially received within the fastener channel of the wedge body.

DETAILED DESCRIPTION

Figure 1:
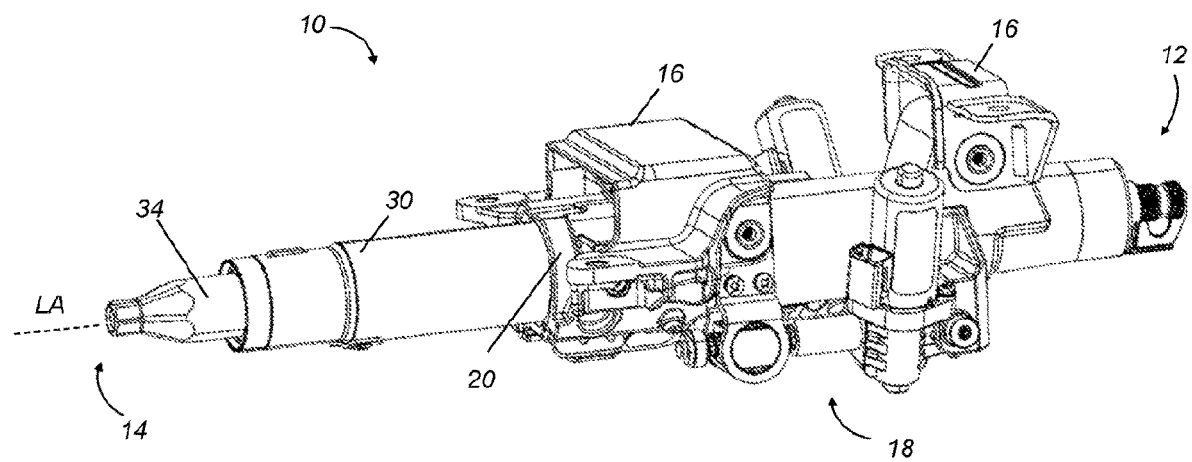
FIG. 1 is an exemplary steering column in accordance with the present teachings.

As required, detailed examples of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings. However, relative positions of elements shown in figures as well as geometries are part of generalized teachings even if not explicitly recited.

With more attention now to the details of the assemblies herein, they generally will include a column housing operatively connected with a bracket structure. The column housing operatively supports a steering shaft that is driven by a steering wheel. For this purpose, the column housing may itself be a tube and/or have a generally hollow structure adapted to receive another tube. It may also receive another tube that supports the steering shaft. One such tube, referred to herein a column tube, typically will have a hollow cavity along at least a portion of (if not the entirety of) the length of the tube and may be sized and configured to receive and support a rotatable shaft, namely a steering shaft and possibly one or more bearings. Both the shaft and any tube (be it a column housing, column tube, or both) will have a longitudinal axis. When installed in a vehicle, the longitudinal axis of each the shaft and any tube may be generally coaxially aligned, aligned generally parallel with a longitudinal axis of a vehicle (e.g., within about 10° or even about) 5°, or each. The shaft, the column housing, and any inner tube may be made of a suitable metal, such as steel or aluminum. Metal components herein may also be made of other metals, such as magnesium. Such metals may be alloys. However, generally pure metals are also possible.

One or more bracket structures (e.g., one that includes a top bracket) may be employed for receiving and/or supporting at least a portion of the steering shaft (e.g., while the shaft is at least partially contained within the column tube, the column housing, or both) and for mounting the steering column assembly within the automotive vehicle. The bracket structure may include a portion, such as an upper plate portion, that is adapted to mount to a vehicle structure (e.g., a cross vehicle beam, an instrument panel, or otherwise) or multiple portions adapted to mount to a vehicle structure. The bracket structure may include a portion that is adapted to support (e.g., pivotally support) a steering shaft (such as by way of a column tube telescopically positioned within a column housing). The bracket structure may be fabricated to include multiple structures, a single unitary structure, or a plurality of components assembled together in an assembly to define a desired bracket structure. The bracket structure may be a cast structure (e.g., structure made by casting a mass), a forged structure (e.g., a structure made by forging a metal mass), a machined structure, a consolidated structure (e.g., a structure made by a step of sintering and/or pressing a powder metal mass), or any combination thereof. One approach is to cast the bracket structure to form a metal casting (e.g., an aluminum alloy, magnesium alloy, or a ferrous metal casting). The bracket structure thus may be configured for integrating functions of mounting within a vehicle and accommodating a tilt function of the assembly relative to a vehicle operator. For instance, the functions may be integrated into a single top bracket or spread among separate bracket components.

The teachings contemplate employing at least one telescoping motor subassembly adapted for selectively driving the steering shaft (by way of a rod or other drive member) in a fore or aft direction generally along the longitudinal axis of the steering shaft. The telescoping motor subassembly may include an electric motor that has a motor shaft that operatively drives a drive member (e.g., a rod that is threaded or has gear teeth over at least a portion of its length). The shaft may drive the drive member by use of one or more gears, by way of a threaded nut or otherwise. The motor shaft may have a longitudinal axis that is oriented generally parallel with the longitudinal axis of the steering shaft and/or inner tube. The motor shaft may have a longitudinal axis that is oriented generally transverse with the longitudinal axis of the steering shaft and/or inner tube. The telescoping motor subassembly may be such that it includes a housing within which the motor is at least partially located. The housing may include one or more flat surfaces that are adapted to slidingly bear against another surface (e.g., a bracket, a flange of the column housing, or some other mounting structure), which other surface may be part of, or be operably connected with the column housing. Such flat surfaces may be a part of a mounting structure for securing the telescoping motor subassembly to the overall assembly. A manually adjustable telescoping assembly may also be employed in the alternative.

The steering column assembly may include a telescoping motor subassembly mounting structure that is coupled during normal operation to the column housing, the telescoping motor subassembly and the inner column tube. The telescoping motor subassembly mounting structure may be adapted to detach from the column housing in the event of an impact exceeding a predetermined first impact load, in accordance with the teachings in of U.S. Publication No. 2013/0233117 (incorporated by reference in its entirety for all purposes). The telescoping motor subassembly mounting structure and/or a motor may be located beneath the column housing. As the telescoping motor subassembly mounting structure detaches from the column housing, it may translate along the underside of the column housing. Thus, the telescoping motor subassembly mounting structure may be adapted to connect with an energy absorption device element and cause the element to plastically deform following an initial breakaway.

The teachings further contemplate employing at least one tilt subassembly that is adapted for selectively raising or lowering the steering shaft. The tilt subassembly may be manually actuated, motorized, or both. It may be attached (e.g., at a first mount location along its length) to the bracket structure. It may be incorporated within a housing structure defined in the bracket structure. It may be attached to or incorporated within a column housing structure. It may be attached at a second location along its length (e.g., at a second mount location that is distal from the upper surface of the bracket structure as compared with the first mount location).

The steering column assembly may include a column tube adapted to be received within the column housing. The column tube may be generally cylindrical. The column tube may have a generally circular cross-section. The column tube may have an oval cross-section. The column tube may have a non-circular cross-section. The column tube may have a cross-section with one or more linear portions, angled portions, non-curved portions, or a combination thereof. For example, the column tube may have a generally square or rectangular cross section. The column tube may be at least partially hollow. The column tube may be entirely hollow. The column tube may support a steering shaft. The column tube may have an outer surface adapted for supporting additional elements of the steering column assembly, such as a wedge assembly.

The column housing may have a shape or an opening within the column housing capable of receiving the column tube and/or allowing for translation of the column tube relative to the column housing. The shape or opening of the column housing may be generally complementary to the shape of the column tube. The shape or opening of the column housing may have one or more portions generally complementary to a portion of the column tube. The shape or opening of the column housing may have a shape that generally matches the shape of the outer dimensions of the column tube.

As indicated, a column housing may be pivotally coupled with the bracket structure, such as by way of a pivotal coupling with a top bracket (e.g., at or proximate a forward end of both the bracket structure (e.g., a top bracket) and the column housing) and is adapted to permit steering shaft adjustment (e.g., tilt adjustment, telescopic adjustment, or both, such as by way of the tilt subassembly, the telescoping motor subassembly, or both). It may have a generally cylindrical shape along at least a portion of its length, such as a rearward portion. It may have a generally cylindrical interior cavity configured for receiving a generally cylindrical column tube. The column housing may be a cast structure (e.g., a structure made by casting a mass), a forged structure (e.g., a structure made by forging a metal mass), a machined structure, a consolidated structure (e.g., a structure made by a step of sintering and/or pressing a powder metal mass) or any combination thereof. It may include one or more planar portions along a side that opposes the side wall of the bracket structure. One preferred approach is to cast the column housing to form an aluminum alloy casting. The column housing may include one or more ribs. It may include a structure (e.g., along a side of the housing so that it projects generally radially outward relative to a longitudinal axis of the housing) onto which an energy absorption device of the teachings of U.S. Publication No. 2013/0233117 (incorporated by reference in its entirety for all purposes; see, e.g., FIGS. 1a-5 and associated discussion of those drawings) may be secured, or into which an energy absorption device may be positioned. A space will typically be defined between the column housing and the bracket structure (e.g., between the column housing and the downwardly projecting side wall of the bracket structure), such as at a location toward the rearward end of the assembly.

For example, the column housing may be generally elongated. It may have a substantially cylindrical configuration over at least a portion of length (e.g., if the column tube has a generally cylindrical shape). It may have a substantially cylindrical configuration defining a hollow channel for receiving a column tube (e.g., if the column tube has a generally cylindrical shape). It may have a shape over at least a portion of its length that is generally similar to the shape of the outer dimensions of the column tube. For example, if the column tube has a square cross-section, the column housing may have a substantially square configuration over at least a portion of its length. It may have a lower portion that has laterally projecting flanges over at least a portion of the column housing length. The flanges may project from both sides of the column housing. The flanges may project laterally outward to a location that extends beyond the outermost reach of the wall from which it projects. The column housing may have one or more openings, e.g., slots, in a lower portion for exposing the inner column tube so that the column tube can be connected with and translate longitudinally with a drive member (e.g., via a suitable bracket) associated with a telescoping motor subassembly. Because the column housing is pivotally connected to the bracket structure (e.g., at or proximate a forward end of the assembly), in the event of a secondary collision, the column housing can remain generally fixed in its normal operational position. Internal collapse may occur by the column tube moving forward and causing one or more portions of the steering column assembly (e.g., the telescoping motor subassembly) to become detached and energy to be absorbed by energy absorption devices that connect the column housing to another portion of the assembly (e.g., the telescoping motor subassembly, the column tube).

The steering column assembly may include a wedge assembly. The wedge assembly may function to achieve column tube de-lash to the column housing. The wedge assembly may reduce component complexity as compared with existing solutions for reducing or eliminating lash of the column housing and column tube. The wedge assembly or portions thereof may provide for higher stiffness of the system. The wedge assembly may provide for a combination of high stiffness while maintaining a lower slide force of the column tube in the housing.

The wedge assembly may include a wedge body and a pre-load member. A fastener or elongated member may be used to hold the wedge assembly in a particular position or define an amount of movement of the wedge assembly within the steering column assembly. The wedge assembly may be a single spring-loaded radial wedge.

The wedge assembly may include a wedge body. The wedge body may have a generally rectangular perimeter, having two generally opposing long edges and two generally opposing short edges. When viewed from the cross section or from the side, one long edge may have a greater thickness than the thickness of the opposing long edge. The thickness may decrease from one long edge to the opposing long edge, creating a generally wedge-like shape.

The wedge body may be made of any suitable material. The wedge body may be made of metal. For example, it may be a relatively low carbon content plain carbon steel (e.g., SAE 1008 steel). The wedge body may be made of plastic. The wedge body may be lubricated to permit sliding or movement of the wedge body against a column tube, a column housing, or both.

The wedge body may have one or more generally curved surfaces. The wedge body may have one or more surfaces adapted to contact a column tube (e.g., a column tube contact face). The one or more surfaces adapted to contact the column tube may have a generally curved shape that generally matches the curvature of the column tube, so the wedge body may be positioned thereon. The wedge body may be dimensioned and/or located so that about 25% or more, about 50% or more, about 75% or more, or about 100% of the surface facing the column tube is in contact with the column tube.

The wedge body may have one or more opposing surfaces (e.g., from the column tube contact face) that are adapted to contact a column housing (e.g., a column housing contact face). The one or more surfaces adapted to contact the column housing may have a shape or configuration that matches one or more features of the column housing. For example, the column housing may include a recess that receives the wedge assembly or a portion thereof. The shape of the wedge body may be such that it can be received within the recess. The column housing contact face may be generally curved. The radius of curvature of the column housing contact face may be the same as the radius of curvature of the column tube contact face. The radius of curvature of the column housing contact face may be different from the radius of curvature of the column tube contact face. The wedge body may be dimensioned and/or located so that about 25% or more, about 50% or more, about 75% or more, or about 100% of the surface facing the column housing is in contact with the column housing.

The angle of the wedge may be determined based on the dimensions or tolerances of the steering column assembly (e.g., of the column tube and the column housing). The angle of the wedge may be measured at the tip of the thin long edge of the wedge body. The wedge angle may be selected such that the wedge assembly may preload the column tube. The angle of the wedge may be about 2 degrees or greater, about 3 degrees or greater, or about 5 degrees or greater. The angle of the wedge may be about 15 degrees or less, about 12 degrees or less, about 10 degrees or less, or about 8 degrees or less.

With a wedge body having one or more generally curved contact surfaces, the angle of a tangent line may vary from one portion of the wedge to another. For example, the angle of a tangent line may be constantly changing from the thick edge toward the thin edge of the wedge. The angle (or a range of angles) between tangent lines of each surface may be about 2 degrees or greater, about 3 degrees or greater, or about 5 degrees or greater. The angle (or a range of angles) may be about 15 degrees or less, about 12 degrees or less, about 10 degrees or less, or about 8 degrees or less.

The wedge body may have a length (L), a width (W), a maximum thickness (Tmax) (e.g., toward a thick edge at a long edge of the wedge body) and a minimum thickness (Tmin) (e.g., toward a thin edge at a long edge of the wedge). The thickness at each long edge may be generally uniform. The thickness at each long edge may be varied. The thickness at a line extending along the length of the wedge body may be generally uniform. The thickness at a line extending along the length of the wedge body may be nonuniform.

The wedge body may have a thinned portion, where the thickness of the thinned portion is less than the thickness at another point in a line along the length of the wedge body. The thinned portion may reduce the amount of material in the wedge body. The thinned portion may reduce the weight of the wedge body. The thinned portion may reduce the surface area contacting the column housing, column tube, or both. The thinned portion may allow for a lower slide force to be maintained of the column tube in the housing. The boundaries of the thinned portion may be generally parallel to the short edges of the wedge body. The thinned portion may be generally centrally located along the length of the wedge body. The thinned portion may be located at the surface facing the column tube, at the surface facing the column housing, or both. When the wedge body is within a steering column assembly, it is contemplated that at least a portion of the thinned portion does not contact the column housing if facing the column housing, does not contact the column tube if facing the column tube, or both. On the surface facing the column tube, it is contemplated that a thinned portion may separate the surface into two column tube contact faces adapted to contact the column tube. On the surface of the wedge body facing the column housing, it is contemplated that a thinned portion may separate the surface into two column housing contact faces adapted to contact the column tube.

The wedge body may include one or more features for securing the wedge into the column housing. Features may include a snap-in feature, hook, or a fastener channel to allow a fastener (e.g., a bolt, a pin, a push nut, an extended member, or otherwise, any of which may be threaded) to attach the wedge body to the column housing. The fastener may be separately formed from the wedge body. The fastener may be integrally formed with the wedge body. The fastener may be part of the wedge body.

The wedge may have an extended member that is retained by a feature of the column housing. The extended member may be molded into the wedge body. The extended member may engage with the column housing (e.g., by snap-fit).

The column housing may have a corresponding opening for receiving the fastener, such that the fastener penetrates the column housing and is received within the fastener channel. The securing features may keep the wedge body in a desired position relative to the column housing while the column tube is telescoping or moving fore and aft within the steering column assembly. The securing features may prevent or limit axial movement of the wedge body while allowing for generally tangential (or lateral) movement of the wedge such that the wedge can move freely to take out clearance that may be caused by wear, thermal expansion, or other operational conditions between the wedge, housing, and column tube.

The fastener channel may penetrate the entire wedge body (e.g., extend through the entire thickness of the wedge body). The fastener channel may extend only partially through the thickness of the wedge body. The fastener channel may be circular. The fastener channel may be elongated, such that the fastener channel has a length that is greater than its width. The width of the fastener channel may be capable of receiving a fastener. The width of the fastener channel may prevent the fastener from moving across the width or rattling. The length may be greater than the width to allow for adjustment of the wedge assembly within the steering column assembly.

The fastener channel may be located at or near a long edge of the wedge body (e.g., the thick edge of the wedge body). The fastener channel may be a cutout or notch formed at an edge of the wedge body. The fastener channel may be open at one side. The fastener channel may be closed at the opposing end of the channel. The closed end may serve as a stop for defining permissible movement of the wedge body in one or more directions and/or for determining a suitable amount of preload on the wedge body and/or the pre-load member of the wedge assembly. The fastener channel may extend along the width of the channel body. The length of the fastener channel may be generally transverse to the longitudinal axis of the wedge body.

Due to the incline of the wedge body, and by use of an elongated slot in the wedge body for attaching the wedge body to the column housing, it is possible during assembly of the column housing with the column tube to make simplified adjustments for achieving the desired position of the wedge assembly relative to the column housing (e.g., relative to an opposing contact surface of the column housing) and/or relative to the column tube. For instance, by moving the wedge located between the column housing and the column tube, the wedge body may close or open any space between the column tube and the column housing. Further, by virtue of a single fastener attachment made possible by the present teachings, a single fastening step can be performed, simply by determining the appropriate desired location of the wedge body relative to the column tube and/or column housing for the steering column assembly and tightening the fastener to an appropriate load state (e.g., to a suitable or predetermined torque level). For instance, the wedge assembly may be secured in a desired pre-loaded state for achieving the appropriate level of resistance relative to the column housing and/or column tube. One or more pre-load members may be employed as well for helping to establish the desired pre-load state.

The wedge assembly includes one or more pre-load members. A pre-load member may be a spring. The pre-load member may be connected to the wedge body. A pre-load member may be configured to bear against another portion of the steering column assembly. For example, a portion of a pre-load member may bear against a portion of the column housing. A pre-load member may be an elongated member having a body and two opposing ends. A pre-load member may be a leaf spring, a flat spring, a wire, or a combination thereof. One or both of the ends of a pre-load member may be generally curved, rounded, or coiled. A curved or coiled end may act to secure a pre-load member to the wedge body. A curved or coiled end may act to prevent catching and/or may act to ease sliding or moving within a cavity. One or both ends of the pre-load member may be configured for engagement with the wedge body. For example, both ends of the pre-load member may engage with the wedge body and the pre-load member body may extend away from the wedge body. The pre-load member body may bear against a portion of the column housing.

A pre-load member may be separately formed from the wedge body. A pre-load member or portions thereof may be integrally formed with the wedge body.

A pre-load member may extend from the wedge body. A pre-load member may be a flexible extended member of the wedge body. The flexible extended member of the wedge body may be a molded feature of the wedge body. The flexible extended member may be capable of undergoing deformation to provide preload.

A pre-load member may be made of a metal material. For example, a pre-load member may be formed of or include steel. A pre-load member may be an elastically compressible material. For example, a pre-load member may be made of or include rubber.

One pre-load member end may be secured to and/or in a fixed relationship to the wedge body. The wedge body may include a post around which the pre-load member end may be wrapped or otherwise secured. The post may be formed in the wedge body. The post may be formed at or near one or more edges of the wedge body. For example, the post may be located at a long edge (e.g., at the thick edge) and near a short edge. The post may be surrounded by or defined by a void around the material forming the post. The post may be integrally formed with the wedge body. The post may be formed of a separate piece otherwise affixed to the wedge body. The height of the post may be less than or about equal to the maximum thickness of the wedge body. The height of the post may be such that it does not extend beyond the thickness of the wedge body on an opposing side of the void surrounding the post. The height of the post may be such that it does not extend beyond the plane of the surrounding wedge body so as not to catch on, disrupt mating relationships between, or inhibit sliding between a surface adjacent (e.g., a column housing or column tube). For example, the post may not extend beyond the column housing contact face.

An opposing end of the pre-load member may be received within a cavity of the wedge body. The cavity may permit some movement of the end of the pre-load member. The cavity may act as a stop or may define the amount of movement permissible. The cavity may determine the amount of preload on the pre-load member.

The cavity may be located on the same long edge (e.g., the thick edge) as the post but adjacent the opposing short end. The cavity may be a cavity penetrating the edge at its thickness. The cavity may be a cutout capable of receiving an end of a pre-load member. The cavity may be a cutout with a portion that overhangs to keep the pre-load member from extending out of the top of the cavity (e.g., to keep the end of the pre-load member within the wedge body and avoid movement in a direction toward the column tube).

With one end of the pre-load member fixed or secured to the post and the opposing end of the pre-load member capable of movement within the cavity, when the pre-load member is compressed toward the wedge body at the pre-load member body, the end of the pre-load member within the cavity may be permitted to move toward the outer edge of the cavity until it reaches a boundary (e.g., a wall defining the cavity). The boundaries of the cavity may provide for controlling of the pre-load of the pre-load member, such that the wedge assembly creates a desired slide force between the column housing and the column tube. For example, the desired slide force may be about 5 N or greater, about 10 N or greater, about 20 N or greater, about 40 N or greater, about 50 N or greater, or about 60 N or greater. The desired slide force may be about 400 N or less, about 300 N or less, or about 200 N or less.

The column housing may have one or more features for receiving the wedge assembly. The column housing may include a recess for receiving at least a portion of the wedge assembly. The recess may be located in the interior of the column housing where the column tube is received. The recess may have a shape that generally matches the wedge shape of the wedge body. The recess may have a thicker portion where the thick long edge is received and a thinner portion where the thin long edge is positioned. The recess may have a wall adapted to contact a portion of the pre-load member (e.g., the pre-load member body) of the wedge assembly. The pre-load member may bear against this contact edge of the column housing, thereby applying the load onto the wedge at a tangent direction with respect to the column tube.

Engagement between the pre-load member of the wedge assembly and the contact edge of the column housing produces a spring force generally tangent to the column tube. The wedge body is thereby pushed further between the column housing and the column tube, thereby reducing or eliminating lash. This creates a vertical force, pushing the column tube toward the housing on the opposing side. Three contact portions may be created-contact between the column housing, wedge assembly and column tube, and two additional contact portions where the column tube contacts the column housing. Each contact portion is approximately 120° from the adjacent contact portion (e.g., three generally equally spaced contact portions around a circle).

An aim of the present design is to also provide or maintain a lower sliding force of the column tube in the housing. The sliding force may be dependent on the spring force, the wedge angle, the contact angles, materials used (and lubrication of the materials), or a combination thereof. The telescope force may be about 5 N or greater, about 10 N or greater, about 25 N or greater, about 50 N or greater, about 75 N or greater, or about 90 N or greater. The telescope force may be about 300 N or less, about 250 N or less, about 200 N or less, about 150 N or less, or about 110 N or less. For example, the desired telescope force may be about 100 N+5 N. Design choices may be made, such as the wedge angle, spring force, preload of the pre-load member, to achieve the desired sliding force. For example, the wedge angle may be about 3 degrees to about 12 degrees. For example, the spring force may be about 20 N to about 40 N (e.g., between about 27 N to about 34 N).

The teachings also contemplate that the steering column assembly includes an energy absorption structure that is adapted to help manage energy that arises in the event of a secondary impact during a vehicle collision.

By way of illustration, without limitation, the steering column assembly of the present teachings may include structures as disclosed in U.S. Publication No. 2013/0233117 (Ser. No. 13/788,637; Read and Martinez), incorporated by reference in its entirety for all purposes.

Such a steering column assembly may include a bracket structure such as a top bracket (typically made of metal, such as aluminum, which may be cast) adapted for attaching to a structure (e.g., a cross car beam, instrument panel, or both) of an automotive vehicle. A displaceable inner tube (e.g., column tube) is configured to receive a steering shaft. A telescoping actuator device (which may be a part of a telescoping motor assembly), such as an electric motor, is operatively attached to the column housing and to the column tube by way of one or more drive members (e.g., a rod) in a manner that allows the inner tube to be actuated selectively in a fore or aft direction by a vehicle operator. The assembly is also such that it allows the telescoping motor assembly to break away from its attachment to the housing, in a controlled manner using one or more energy absorption device elements, which elements may be selected on the basis of a particular vehicle application, and may be designed for varying or tuning the desired response (e.g., timing of detachment and/or plastic deformation during a collapse stroke). During a secondary impact event, the force of the impact by the vehicle operator is thus transmitted through by the steering shaft to the column tube and the drive member, causing initial disengagement of the telescoping motor assembly. Additional energy from the impact is absorbed by one or more energy absorption elements that are situated relative to (e.g., operatively between) the telescoping motor assembly and the inner tube, the housing, or both. The one or more energy absorption device elements may be configured (e.g., as a generally folded and relatively thin elongated metallic strip or bend plate that is capable of plastically deforming) and the material selected (e.g., a plain carbon steel, a steel alloyed with one or more other metals, or some other steel or metal) so that they plastically deform to absorb impact energy. Such plastic deformation may be deformation in the absence of elongation; thus it is possible that the metallic strip or bend plate will be folded upon itself and be constrained so that it either gets pulled around an edge of a structure (e.g., a flange, such as a flange associated with the inner column housing) or pushed against a wall for causing the deformation. In this manner, it may be possible to achieve a load and displacement relationship that may include a first stage, in which as load increases displacement increases to a peak displacement corresponding with initial disengagement of the telescoping motor assembly. In a following stage, after a possible energy absorption load delay (which delay may be selectively adjusted by the shape, size, or other characteristic of the energy absorption device elements), reliance upon the one or more energy absorption device elements occurs as energy from the load is primarily absorbed by way of deformation (including plastic deformation) of the energy absorption device elements.

The teachings herein also envision a method of assembling a steering column assembly (e.g., the assembly above described). The method may include steps of positioning a column tube, which carries or is adapted to receive a steering shaft, within a column housing having a forward end and a rearward end, and having an outer wall and a longitudinal axis (e.g., the outer wall may be generally arcuate, such that the column housing has a generally hollow cylindrical structure over some or all of its length). The wedge assembly may be installed from an open end of the column housing along the housing axis. It is also contemplated that a radial pocket in the column housing may be present through which the wedge assembly is inserted. The wedge assembly may be positioned between the column tube and the column housing, such that the wedge body is located within the recess of the column housing and the pre-load member is in contact with the contact edge defining a portion of the recess. The opening of the column housing for receiving a fastener is generally aligned with the fastener channel of the wedge body, and a fastener is inserted through the opening of the column housing and is received within the channel body. The pre-load of the wedge assembly (e.g., pre-load of the pre-load member) should be controlled such that the wedge and the pre-load member system create a desired slide force between the column housing and the column tube (e.g., about 5 N to about 300 N or any range therebetween).

Turning now to the figures, FIG. 1 illustrates an exemplary steering column assembly 10 having a forward end 12 and a rearward end 14. The assembly includes a column housing 20 that at least partially receives and/or supports a column tube 30. The column tube is operatively connected with a steering wheel (not shown), e.g., via steering shaft 34. Both the steering shaft 34 and the column tube 30 have a longitudinal axis LA. When installed in a vehicle, the longitudinal axis LA of each the steering shaft and the column tube may be generally coaxially aligned, aligned generally parallel to each other, aligned generally parallel to a longitudinal axis of the vehicle, or a combination thereof.

As illustrated, the steering column assembly 10 includes bracket structures 16. One or more of the bracket structures allow for attachment of the steering column assembly within the vehicle. One or more of the bracket structures may permit pivoting of the steering column assembly to adjust the position of the steering wheel (e.g., to adjust the tilt of the steering column assembly). A bracket structure 16 as shown is pivotally connected to the column housing 20 for accommodating a tilt function of the assembly relative to a vehicle operator.

The steering column assembly 10 includes an adjustment subassembly 18, which permits for telescoping adjustment of the steering column assembly, tilt adjustment of the steering column assembly, or both. The steering column assembly 10 as illustrated is an electric adjustment subassembly, employing one or more motors to achieve adjustment. Manual assemblies (e.g., through use of a user operating device such as a lever) are also contemplated.

Figure 2:
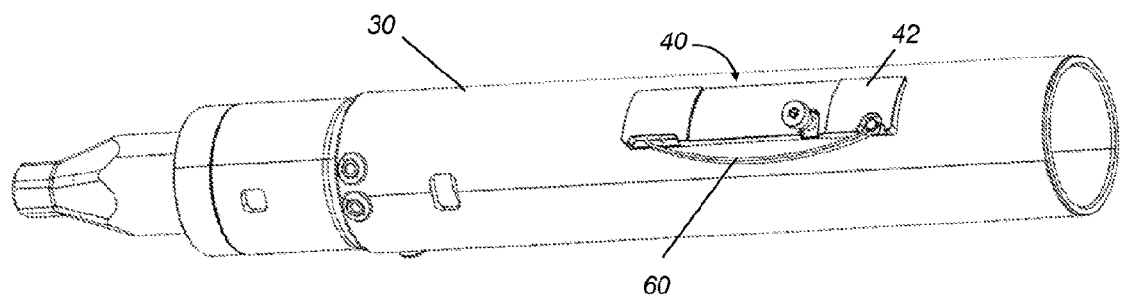
FIG. 2 is an exemplary column tube and wedge assembly in accordance with the present teachings.

FIG. 2 illustrates a column tube 30 with a wedge assembly 40 positioned thereon. The wedge assembly 40 includes a wedge body 42 and a pre-load member 60.

While the column tube is shown as being generally cylindrical or having a generally circular cross-section, other shapes of the column tube are also contemplated. For example, the column tube may have a square or rectangular cross-section. The wedge body may be shaped to be generally complementary to the shape of the outer surface of the column tube. The wedge body may be shaped to attach to or be positioned on the outer surface of column tube (e.g., without rocking).

Figure 3:
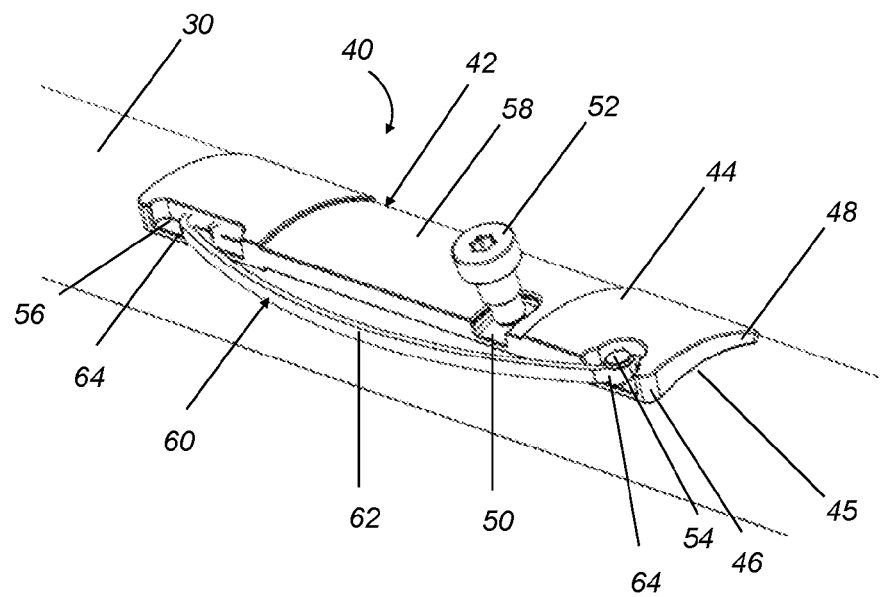
FIG. 3 is an enlarged view of the wedge assembly of FIG. 2.

FIG. 3 is an enlarged view of the wedge assembly 40 of FIG. 2. The wedge assembly includes a wedge body 42 having a column housing contact face 44 (or two column housing contact faces separated by a thinned portion 58) adapted to contact a column housing 20 (see FIG. 5) and a column tube contact face 45 (or two column tube contact faces separated by a thinned portion 58) having a curved surface that is adapted to contact an outer surface of the column tube 30. At its long edges, the wedge body 42 has a thick edge 46 and a thin edge 48, where the thickness of the wedge body decreases from thick edge 46 to thin edge 48, as viewed from the short edges or a cross-section of the wedge body. A fastener 52 penetrates an opening 24 in the column housing 20 (see FIG. 5) and is received within with a fastener channel 50 of the wedge body 42. The fastener channel has a width capable of receiving the fastener 52 and a length that permits at least some movement of the fastener along the length, such that if the wedge body is forced into a gap between a column tube and a column housing, some movement of the wedge body is permitted while the fastener is still located within the wedge body. The fastener channel 50 is situated generally orthogonally to the longitudinal axis of the wedge body.

The wedge assembly 40 includes a pre-load member 60 having an elongated body 62 and two ends 64 on opposing sides of the elongated body. The ends 64 as shown are curved or coiled, though other configurations or shapes are also contemplated. One end 64 wraps around a post 54 of the wedge body 42. The opposing end 64 of the pre-load member 60 is received within a cavity 56 of the wedge body 42. As a force is exerted on the elongated body 62 of the pre-load member 60, the end 64 around the post 54 remains fixed while the opposing end 64 within the cavity 56 is permitted to move within the confines of the cavity and engage with or contact one or more surfaces defining the cavity. The engagement between the end 64 and the cavity 56 may allow the wedge assembly 40 to be pushed between the column tube 30 and column housing 20 as a de-lash mechanism.

Figure 4:
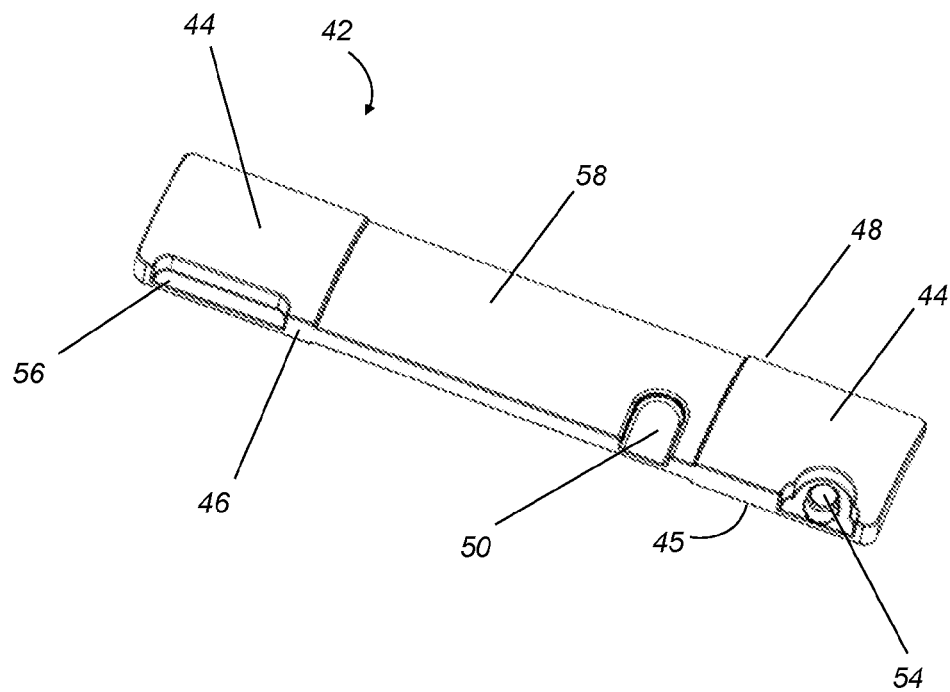
FIG. 4 is an exemplary wedge body in accordance with the present teachings.

FIG. 4 illustrates a wedge body 42 having a column housing contact face 44 (or a pair of column housing contact faces 44) adapted to contact a portion of the column housing when assembled within a steering column assembly. The opposing surface is a column tube contact face 45 (or a pair of column tube contact faces) adapted to contact a portion of the column tube of the steering column assembly. The wedge body 42 as illustrated also includes a thinned portion 58, generally centrally located between two column housing contact faces 44.

The wedge body 42 has a pair of long edges and a pair of short edges forming a generally rectangular body. A long edge may have one or more segments of greater thickness than opposing segments on an opposing long edge. One long edge, or portions thereof, is a generally thick edge 46, and the opposing long edge, or portions thereof, is a generally thin edge 48, as compared with the thick edge. The thickness of the wedge body 42 may generally decrease from one long edge to an opposing long edge, at least in certain portions. This decrease in thickness may be viewed from the short edges or from the cross-section of the wedge body.

The thickness of the thinned portion 58 may be different from the thickness of one or more other segments of the thick edge 48, the thickness of one or more segments of the thin edge 48, or both. The thickness of the thinned portion 58 may still decrease from one long edge to the opposing long edge, though the angle and/or slope may be different. The thickness of the thinned portion 58 may be generally uniform from long edge to long edge. The thinned portion may be formed on one face or both faces of the wedge body 42. For example, a thinned portion 58 may be present, located between two column housing contact faces 44. A thinned portion 58 may be present between two column tube contact faces 45. The wedge body 42 may have a single continuous column housing contact face, a single continuous column tube contact face, or both (e.g., where there is only a thinned portion on one surface of the wedge body, or where there is no thinned portion on the wedge body).

The wedge body 42 includes features for engaging or interacting with a pre-load member (see FIG. 3). The wedge body includes a post 54 around which a portion of a pre-load member may be wrapped or otherwise secured. The post 54 is surrounded by a void in the wedge body, such that the post 54 is formed within the wedge body 42 and does not extend beyond a plane of or tangent to the column housing contact face 44.

The wedge body 42 includes a cavity 56 configured to receive an opposing end of a pre-load member from the end that contacts the post 54. The cavity 56 is defined by one or more contact surfaces for the end of the pre-load member to contact while a force is exerted on the pre-load member. The end of the pre-load member may be permitted to move within the confines of the cavity until reaching a boundary of the cavity. Upon reaching the boundary, the wedge body 42 may be forced between the column tube and the column housing of a steering column assembly.

The wedge body includes a fastener channel 50. As shown, the fastener channel 50 is located in the thinned portion 58, though other configurations are also contemplated. The fastener channel extends from one long edge of the wedge body toward the center of the wedge body. The fastener channel 50 has a width capable of receiving a fastener therein and a length that allows for the wedge body to move a predetermined distance as the wedge body is forced between the column tube and the column housing.

Figure 5:
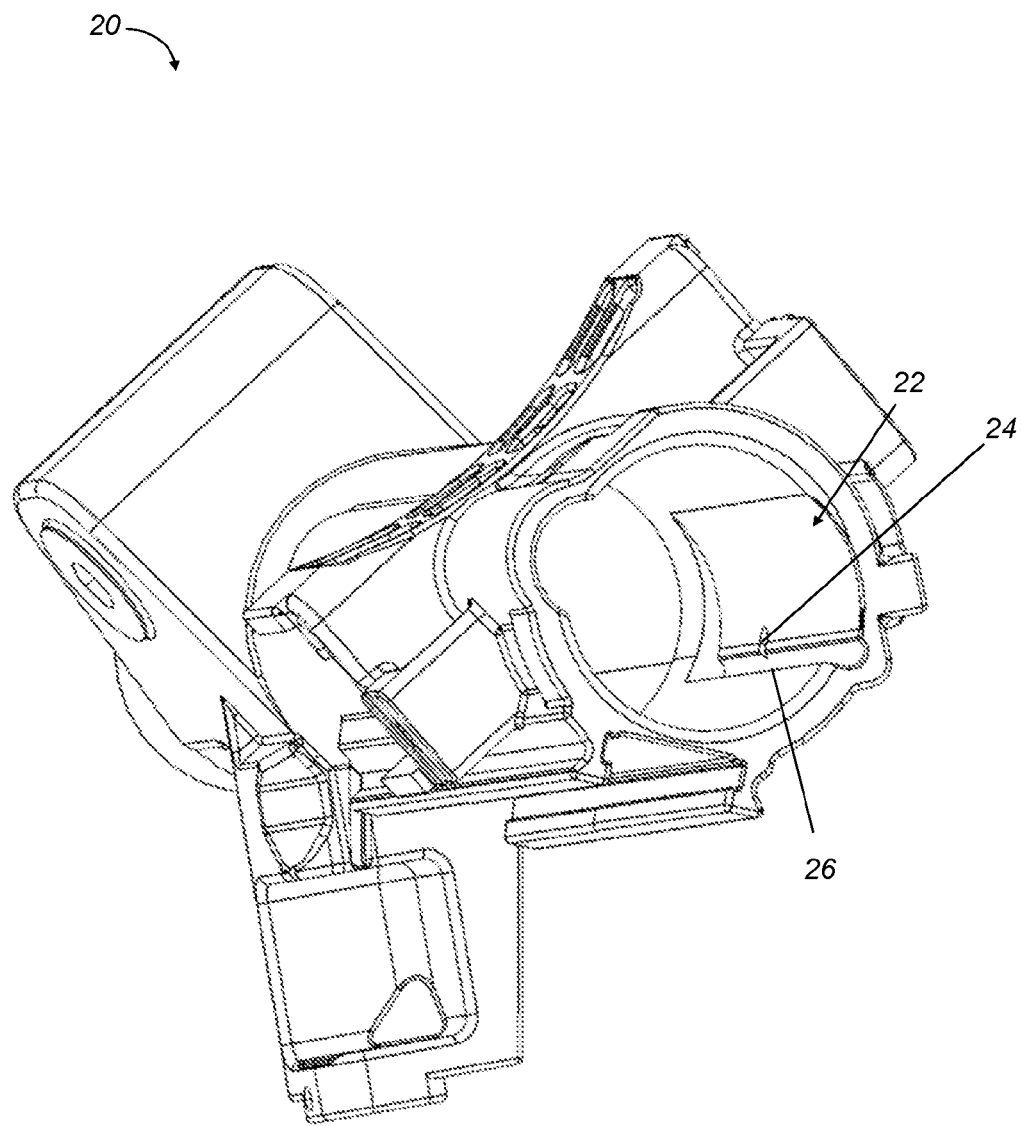
FIG. 5 is an exemplary column housing in accordance with the present teachings.

FIG. 5 illustrates an exemplary column housing 20. The column housing 20 includes a generally cylindrical interior surface having a recess 22 configured to receive the wedge assembly 40 (see FIG. 3). An opening 24 penetrating the column housing is located at the recess 22 for receiving a fastener 52 that is also received within the fastener channel 50 of the wedge body 42 (see FIG. 3). The depth of the recess varies to accommodate the shape of the wedge body, shown here to accommodate a wedge body having a thick edge and a thin edge. The depth of the recess is greatest at or near a contact edge 26, where the elongated body 62 of the pre-load member 60 bears against the contact edge 26.

Figure 6:
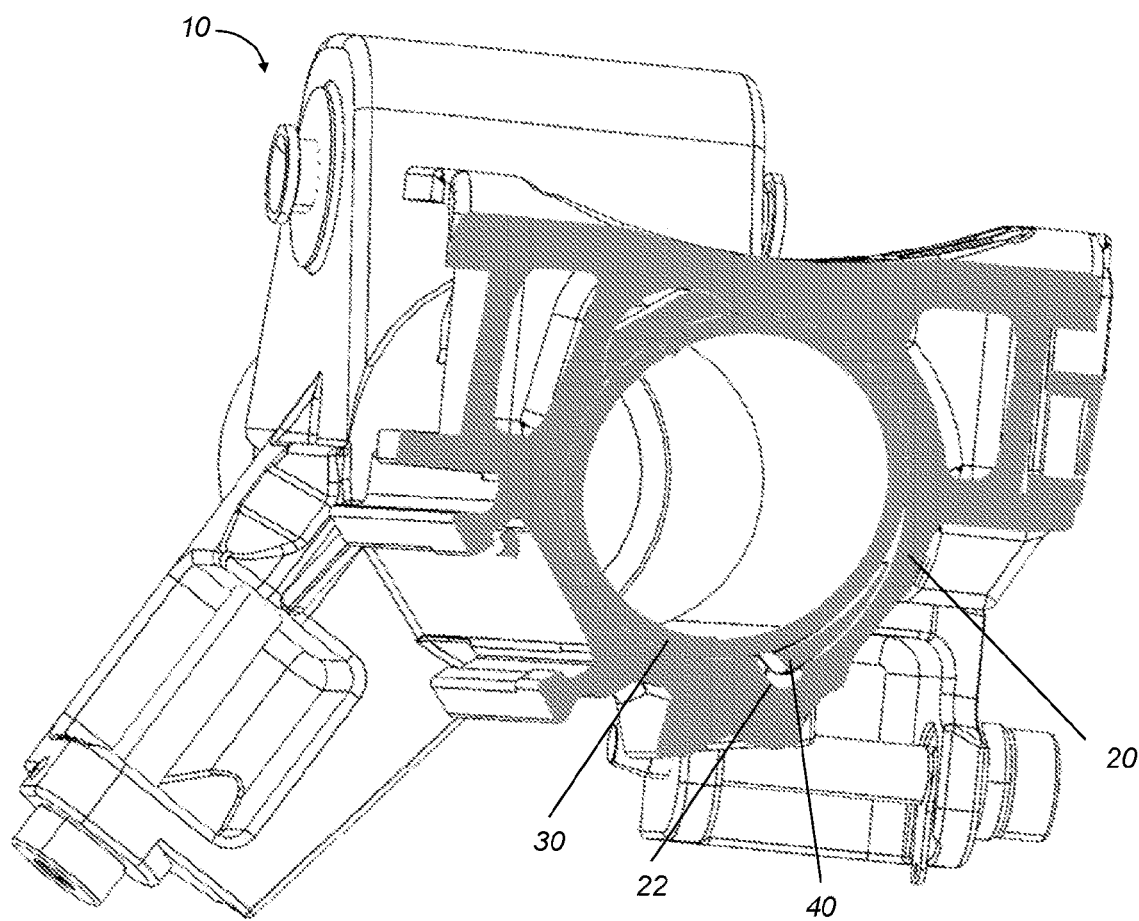
FIG. 6 is a cross-sectional view of a column housing, column tube, and wedge assembly in accordance with the present teachings.

FIG. 6 is a cross-section of the steering column assembly 10 having a column housing 20 and a column tube 30. Located between the column housing 20 and the column tube 30 and within the recess 22 of the column housing 20 is a wedge assembly 40.

Figure 7:
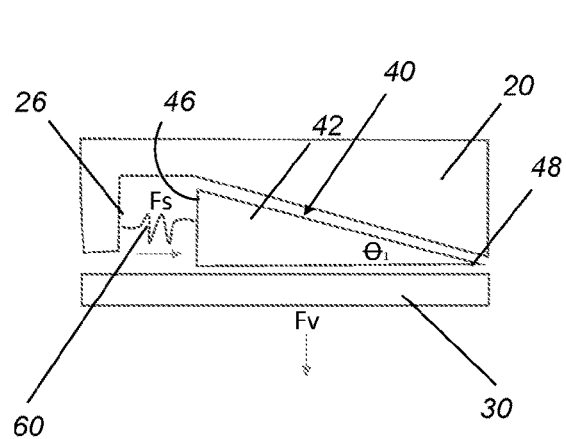
FIG. 7 is a free body diagram illustrating interactions between elements of the steering column assembly.

FIG. 7 is a free body diagram illustrating the forces in the steering column assembly as a result of the wedge assembly 40. The wedge body has a thick edge 46 and a thin edge 48, forming an angle $\theta_1$. As shown, the pre-load member 60 bears against the contact edge 26 of the column housing 20. The spring force Fs is illustrated by the horizontal arrow. The wedge body 42 is pushed in the direction of the spring force $F_s$, pushing the column tube 30 and creating a vertical force $F_v$.

Figure 8:
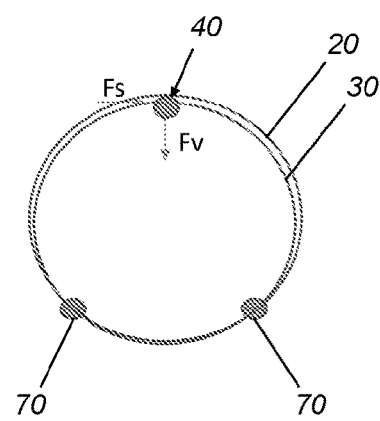
FIG. 8 illustrates the contact portions within the steering column assembly due to the forces exerted by as a result of the wedge assembly in accordance with the present teachings.

FIG. 8 is a simplified illustration of the forces due to the wedge assembly 40, thereby creating contact portions 70 where the column tube is forced toward the column housing. The spring force $F_s$ is generally at a tangent to the outer surface of the column tube 30. A vertical force $F_v$ results in the column tube 30 being pushed toward the column housing 20 at contact portions 70, thereby reducing or eliminating lash.

The present teachings illustrate examples of the structure and operation of an electric reach and rake steering column assembly for a vehicle in accordance with the present teachings. Though shown as an internal collapsing system, the teachings find application for other collapse modes (e.g., external collapsing) as well. The assembly may have a tilt adjustment feature and a telescopic adjustment feature. As to each such feature, there are associated motors. However, it is possible that one of the motors may be omitted (e.g., it is possible that the tilt adjustment is achieved manually without a motor, such as by using a lever or other user-operated mechanism).

Elements described herein may be formed of multiple pieces (e.g., the wedge body may be formed of two or more pieces, rather than a unitary piece). Elements described herein may be unitary. For example, the pre-load member and wedge body could be integrally formed, rather than having a separate pre-load member and separate wedge body. For example, the pre-load member may have a flexible extended member of the wedge body. The flexible extended member may be a molded feature of the wedge body that can deform to provide preload. The column housing may have a feature that acts as a pre-load member.

While the column tube is illustrated as a generally cylindrical body, it is contemplated that a column tube may have a non-circular cross section. For example, a column tube may have a square or rectangular cross-section. The shape of the column housing or the portion receiving the column tube may have a shape that allows for translation of the column tube within the column housing. The portion of the column housing receiving the column tube may have a shape generally similar to the shape of the outer surface of the column tube While described herein as a wedge assembly that pushes against a column housing, it is also contemplated that the structure may be altered such that the pre-load member pushes against the column tube.

While illustrated as having two contact surfaces between the wedge body and the column tube or between the wedge body and the column housing, it is contemplated that there may be a single contact surface. It is also contemplated that there may be more than two contact surfaces.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

Relative dimensions and/or proportions disclosed herein (e.g., in the written text as well as the drawings) are part of the teachings, even if not explicitly recited.

The disclosures of all articles and references, including patent applications and publications, are incorporated by reference in their entireties for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described.

| Element List | |
|---|---|
| 10 | Steering column assembly |
| 12 | Forward end |
| 14 | Rearward end |
| 16 | Bracket structures |
| 18 | Adjustment subassembly |
| 20 | Column Housing |
| 22 | Recess |
| 24 | Opening |
| 26 | Contact edge |
| 30 | Column tube |
| 34 | Steering shaft |
| 40 | Wedge assembly |
| 42 | Wedge body |
| 44 | Column housing contact face |
| 45 | Column tube contact face |
| 46 | Thick edge |
| 48 | Thin edge |
| 50 | Fastener channel |
| 52 | Fastener |
| 54 | Post |
| 56 | Cavity |
| 58 | Thinned portion |
| 60 | Pre-load member |
| 62 | Elongated body |
| 64 | Curved or coiled end |
| 70 | Contact portions |
| $F_s$ | Spring force |
| $\Theta_1$ | Angle |
| Fv | Vertical force |

What is claimed is:

1. A wedge assembly for a steering column assembly comprising:
   a) a pre-load member having an elongated body; and
   b) a wedge body comprising:
      i) a column tube contact face configured to contact an outer surface of a column tube;
      ii) a column housing contact face configured to contact a column housing;
      iii) a pair of generally opposing long edges, wherein one long edge is a thick edge and wherein the opposing long edge is a thin edge, wherein a thickness of the wedge body decreases from the thick edge to the thin edge;
      iv) a pair of generally opposing short edges;
      v) a post, one or more cavities, or both; and
      vi) a securing feature for securing the wedge assembly within the column housing, between the column housing and column tube, or both.

2. The wedge assembly of claim 1, wherein the wedge body has a wedge angle of about 3 degrees to about 12 degrees.

3. The wedge assembly of claim 1, wherein the column tube contact face, column housing contact face, or both, has a generally curved contact surface; and wherein an angle between tangent lines along the generally curved contact surface is about 3 degrees or greater, about 12 degrees or less, or both.

4. The wedge assembly of claim 1, wherein the pre-load member is a spring, and wherein the spring is a flat spring, leaf spring, wire spring, steel spring, or a combination thereof.

5. The wedge assembly of claim 1, wherein the pre-load member has a first end and a second end; wherein the first end, the second end, or both, are curved and/or coiled.

6. The wedge assembly of claim 1, wherein the wedge body includes the one or more cavities; wherein the pre-load member has a first end and a second end; and wherein the first end, the second end, or both, is received within the one or more cavities of the wedge body.

7. The wedge assembly of claim 1, wherein the securing feature allows for generally lateral and/or tangential movement of the wedge body.

8. The wedge assembly of claim 1, wherein a load of the pre-load member is generally tangential with respect to the column tube.

9. The wedge assembly of claim 1, wherein the wedge body includes the post and the post is created by a void of material surrounding the post.

10. The wedge assembly of claim 1, wherein the wedge body includes the post and the post does not extend beyond the column housing contact face.

11. The wedge assembly of claim 1, wherein the wedge body has a thinned portion, and wherein the thinned portion has a thickness that is less than a thickness at another point in a line along a length of the wedge body.

12. The wedge assembly of claim 1, wherein the wedge assembly has a controlled pre-load such that the wedge assembly creates a slide force between the column housing and the column tube of about 5 N to about 300 N.

13. A wedge assembly comprising:
   a) a pre-load member having an elongated body; and
   b) a wedge body comprising:
      i) a column tube contact face configured to contact an outer surface of a column tube;
      ii) a column housing contact face configured to contact a column housing;
      iii) a pair of generally opposing long edges, wherein one long edge is a thick edge and wherein the opposing long edge is a thin edge, wherein a thickness of the wedge body decreases from the thick edge to the thin edge, iv) a pair of generally opposing short edges; and
v) post;
wherein the pre-load member has a first end and a second end; and
wherein the first end or the second end is secured to and/or positioned at least partially around the post of the wedge body.

14. The wedge assembly of claim 13, wherein the wedge body includes one or more securing features for securing the wedge assembly within the column housing, between the column housing and column tube, or both.

15. The wedge assembly of claim 13, wherein the pre-load member is a spring, and wherein the spring is a flat spring, leaf spring, wire spring, steel spring, or a combination thereof.

16. The wedge assembly of claim 13, wherein the post is created by a void of material surrounding the post and/or wherein the post does not extend beyond the column housing contact face.

17. A wedge assembly comprising:
a) a pre-load member having an elongated body; and
b) a wedge body comprising:
   i) a column tube contact face configured to contact an outer surface of a column tube;
   ii) a column housing contact face configured to contact a column housing;
   iii) a pair of generally opposing long edges, wherein one long edge is a thick edge and wherein the opposing long edge is a thin edge, wherein a thickness of the wedge body decreases from the thick edge to the thin edge;
   iv) a pair of generally opposing short edges; and
   v) a cavity,
wherein the cavity comprises one or more surfaces for contacting a first end or a second end of the pre-load member for defining an amount of movement of the pre-load member when compressed and/or to allow the pre-load member free movement throughout an operating range.

18. The wedge assembly of claim 17, wherein the wedge body includes a fastener channel for receiving a fastener; and wherein the fastener channel penetrates at least a portion of the wedge body.

19. The wedge assembly of claim 17, wherein the pre-load member is a spring, and wherein the spring is a flat spring, leaf spring, wire spring, steel spring, or a combination thereof.

20. The wedge assembly of claim 17, wherein the wedge body has a wedge angle of about 3 degrees to about 12 degrees; or wherein the column tube contact face, column housing contact face, or both, has a generally curved contact surface and an angle between tangent lines along the generally curved contact surface is about 3 degrees to about 12 degrees.

* * * * *